United States Patent
Lai et al.

(10) Patent No.: US 8,829,714 B2
(45) Date of Patent: Sep. 9, 2014

(54) UNINTERRUPTIBLE POWER SUPPLY AND POWER SUPPLYING METHOD THEREOF

(75) Inventors: Yuan-Fang Lai, Taoyuan Hsien (TW); Chiou-Feng Wang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 599 days.

(21) Appl. No.: 13/045,304

(22) Filed: Mar. 10, 2011

(65) Prior Publication Data
US 2011/0241428 A1    Oct. 6, 2011

(30) Foreign Application Priority Data
Mar. 30, 2010  (TW) .............................. 99109506 A

(51) Int. Cl.
*H02J 7/00*    (2006.01)
(52) U.S. Cl.
USPC .......................................................... 307/66
(58) Field of Classification Search
USPC .......................................................... 307/66
See application file for complete search history.

(56) References Cited

U.S. PATENT DOCUMENTS

| 7,466,038 | B2 * | 12/2008 | Gaudreau et al. ............... 307/82 |
| 2001/0011845 | A1 | 8/2001 | Simonelli et al. |
| 2005/0043859 | A1 * | 2/2005 | Tsai et al. ..................... 700/286 |
| 2010/0102636 | A1 * | 4/2010 | Tracy et al. ..................... 307/80 |
| 2011/0006607 | A1 * | 1/2011 | Kwon et al. ..................... 307/66 |

FOREIGN PATENT DOCUMENTS

| CN | 1738142 | 2/2006 |
| TW | 591845 | 6/2004 |
| TW | 1245479 | 12/2005 |
| TW | 200838091 | 9/2008 |

* cited by examiner

*Primary Examiner* — Jared Fureman
*Assistant Examiner* — Duc M Pham
(74) *Attorney, Agent, or Firm* — Evan R. Witt; Kirton McConkie

(57) ABSTRACT

An uninterruptible power supply includes plural power modules and a controlling module. The power modules are electrically connected with a power source, an energy storage unit and a load for converting an input voltage into an output voltage. The controlling module is electrically connected with the plural power modules and the energy storage unit for detecting a storage voltage of the energy storage unit and dynamically adjusting the output voltage of the plural power modules according to the storage voltage of the energy storage unit. If the controlling module is abnormal, the magnitude of the output voltage is maintained at a constant voltage value.

13 Claims, 2 Drawing Sheets

UNINTERRUPTIBLE POWER SUPPLY AND POWER SUPPLYING METHOD THEREOF

FIELD OF THE INVENTION

The present invention relates to an uninterruptible power supply, and more particularly to an uninterruptible power supply for continuously outputting stable power even if a controlling module has a breakdown. The present invention also relates to a power supplying method for use with an uninterruptible power supply.

BACKGROUND OF THE INVENTION

With increasing development of information industries and high-tech industries, most precise electronic instruments and facilities need highly reliable power to maintain normal operations. Generally, an uninterruptible power supply (UPS) are widely used to provide stable power to the loads that are connected with the UPS. In other words, UPS apparatuses become essential for supplying stable power.

In other words, the uninterruptible power supply (UPS) is interconnected between a power source and a load. The power source may be a utility power source, an AC power source for providing a regulated AC voltage, or a DC power source for providing a regulated DC voltage. In a case that the power source is normal, the electrical energy provided by the power source will charge the backup battery. Once the power source is abnormal, the storage voltage of the backup battery will be converted into the rated voltage of the load for maintaining normal operations of the load.

For protecting important electronic devices in a more effective manner, the uninterruptible power supply is widely employed to assure normal operations of various electronic devices.

Recently, a high-capacity uninterruptible power supply is developed to increase the reliability and reduce the maintenance time. The high-capacity uninterruptible power supply includes plural power modules that are connected with each other in parallel. Generally, a controller is used to control operations of the plural power modules. In a case that one of the power modules is damaged, the uninterruptible power supply could still output stable power. Since the uninterruptible power supply has a single controller, if the controller is damaged, the plural power modules fail to be effectively controlled. In this circumstance, the output voltage is interrupted or abnormal, or even the load or the battery may be damaged to incur serious safety events. That is, the controller is an important device influencing the reliability of the uninterruptible power supply.

Recently, the controller of the uninterruptible power supply is gradually developed in a modular manner. If the modular controller is damaged, the modular controller could be quickly repaired to normally provide stable power. The modular controller, however, fails to increase the reliability of the uninterruptible power supply. If modular controller is damaged, the output voltage is still abnormal.

For increasing the reliability of the uninterruptible power supply, the uninterruptible power supply may be equipped with two controllers. One of the two controllers is responsible for controlling the power modules to output electrical energy. If this controller is damaged, the other controller will take some simple measures to maintain a constant output voltage and thus a sufficient time is provided to repair the damaged controller. Although the uses of two controllers may increase the reliability of the uninterruptible power supply, the additional controller increase the overall cost of the uninterruptible power supply.

Therefore, there is a need of providing an improved uninterruptible power supply so as to obviate the drawbacks encountered from the prior art.

SUMMARY OF THE INVENTION

It is an object of the present invention to provide an uninterruptible power supply and a power supplying method for providing stable power even if the controlling module is abnormal.

In accordance with an aspect of the present invention, there is provided an uninterruptible power supply. The uninterruptible power supply is connected with an energy storage unit and a load. An input voltage from a power source is received by the uninterruptible power supply. The uninterruptible power supply includes plural power modules and a controlling module. The power modules are electrically connected with the power source, the energy storage unit and the load for converting the input voltage into an output voltage. The controlling module is electrically connected with the plural power modules and the energy storage unit for detecting a storage voltage of the energy storage unit and dynamically adjusting the output voltage of the plural power modules according to the storage voltage of the energy storage unit. If the controlling module is abnormal, the magnitude of the output voltage is maintained at a constant voltage value.

In accordance with another aspect of the present invention, there is provided a power supplying method for use with an uninterruptible power supply. The uninterruptible power supply includes a controlling module and plural power modules. The uninterruptible power supply is connected with an energy storage unit, a load and a power source. The power supplying method includes steps of receiving an input voltage from the power source and converting the input voltage into an output voltage by the plural power modules, detecting a storage voltage of the energy storage unit by the controlling module, dynamically adjusting the magnitude of the output voltage of the plural power modules by the controlling module according to the storage voltage of the energy storage unit, and maintaining the magnitude of the output voltage at a constant voltage value if the controlling module is abnormal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
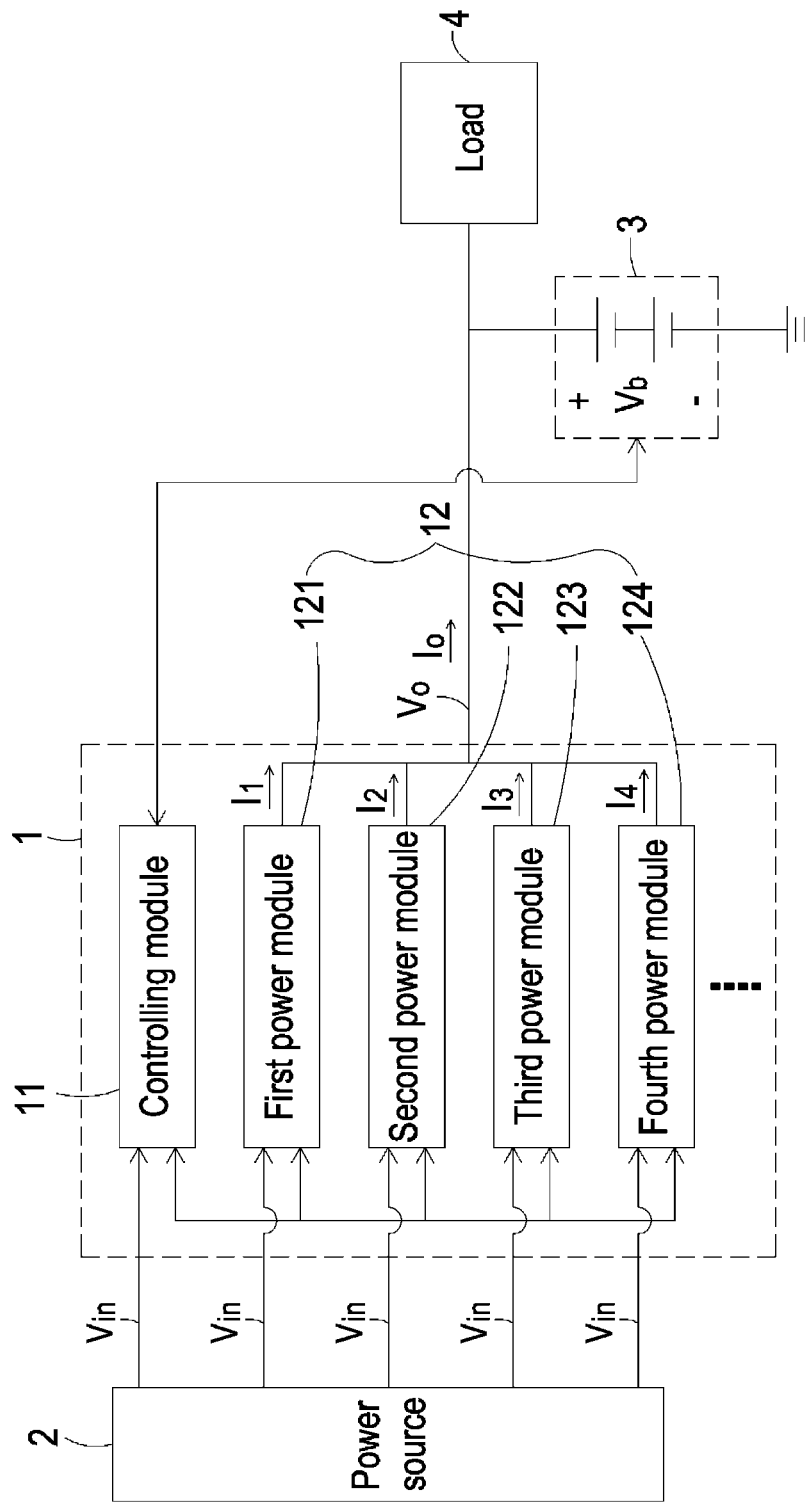
FIG. 1 is a schematic circuit diagram illustrating an uninterruptible power supply according to an embodiment of the present invention.

FIG. 1 is a schematic circuit diagram illustrating an uninterruptible power supply according to an embodiment of the present invention. As shown in FIG. 1, the uninterruptible power supply 1 is connected with a power source 2, an energy storage unit 3 and a load 4. In a case that the power source 2 is normal, an input voltage is received by the uninterruptible power supply 1, and the uninterruptible power supply 1 can provide electrical energy required for powering the load 4 and charging the energy storage unit 3. Once the power source is abnormal, the storage voltage of the energy storage unit 3 will be converted into the rated voltage of the load 4 for maintaining normal operations of the load 4.

In this embodiment, the uninterruptible power supply 1 includes a controlling module 11 and plural power modules 12. The input voltage $V_{in}$ transmitted from the power source 2 and received by the uninterruptible power supply 1 is a DC voltage. An example of the energy storage unit 3 includes but is not limited to a battery.

In this embodiment, the plural power modules 12 include a first power module 121, a second power module 122, a third power module 123 and a fourth power module 124. The number of power modules may be varied according to the practical requirements. The first power module 121, the second power module 122, the third power module 123 and the fourth power module 124 are communicable with each other and connected with each other in parallel. In addition, the first power module 121, the second power module 122, the third power module 123 and the fourth power module 124 are electrically connected with the power source 2, the energy storage unit 3 and the load 4. By the first power module 121, the second power module 122, the third power module 123 and the fourth power module 124, the input voltage $V_{in}$ transmitted from the power source 2 is received and converted into an output voltage $V_o$.

The controlling module 11 is electrically connected with the energy storage unit 3 and the power source 2. In addition, the controlling module 11 is in communication with and electrically connected with the first power module 121, the second power module 122, the third power module 123 and the fourth power module 124. In a normal operating mode, the controlling module 11 can detect the storage voltage $V_b$ of the energy storage unit 3. In addition, since the controlling module 11 is in communication with the first power module 121, the second power module 122, the third power module 123 and the fourth power module 124, the controlling module 11 could realize the magnitude of the current output voltage $V_o$. According to the storage voltage $V_b$ and the magnitude of the current output voltage $V_o$, the controlling module 11 will judge whether the magnitude of the output voltage $V_o$ needs to be adjusted or not. Once the magnitude of the output voltage $V_o$ needs to be adjusted, the magnitude of the output voltage $V_o$ of respective power modules 12 are dynamically adjusted. That is, the controlling module 11 will issue a notifying signal. In response to the notifying signal, the first power module 121, the second power module 122, the third power module 123 and the fourth power module 124 adjust respective output voltages $V_o$.

For example, in a case that the acceptable voltage range of the energy storage unit 3 is from 300V to 350V, 300V is a lower limit voltage level and 350V is an upper limit voltage level. If the storage voltage $V_b$ of the energy storage unit 3 detected by the controlling module 11 is 300V, it is meant that the residual electricity of the energy storage unit 3 is insufficient and the energy storage unit 3 needs to be charged. Once the controlling module 11 is in communication with the first power module 121, the second power module 122, the third power module 123 and the fourth power module 124, the controlling module 11 could realize the magnitude of the current output voltage $V_o$. If the magnitude of the current output voltage $V_o$ is higher than 300V (e.g. 310V), the controlling module 11 will notify the first power module 121, the second power module 122, the third power module 123 and the fourth power module 124 to continuously charge the energy storage unit 3 at the current output voltage $V_o$. Whereas, if the magnitude of the current output voltage $V_o$ is lower than 300V, the controlling module 11 will notify the first power module 121, the second power module 122, the third power module 123 and the fourth power module 124 to adjust the output voltage $V_o$ to for example 310V in order to charge the energy storage unit 3. Until the storage voltage $V_b$ of the energy storage unit 3 reaching 310V is detected by the controlling module 11, the controlling module 11 will notify the first power module 121, the second power module 122, the third power module 123 and the fourth power module 124 to adjust the output voltage $V_o$ to for example 320V in order to charge the energy storage unit 3. The above procedures are repeatedly done in order to dynamically adjust the magnitude of the output voltage $V_o$ until the storage voltage $V_b$ of the energy storage unit 3 reaches 350V. That is, until the storage voltage $V_b$ of the energy storage unit 3 reaches the upper limit voltage level, the procedure of charging the energy storage unit 3 is stopped.

In a case that the controlling module 11 is normally operated, the output currents of the first power module 121, the second power module 122, the third power module 123 and the fourth power module 124 are controlled and adjusted by the controlling module 11. Once the controlling module 11 is in communication with the first power module 121, the second power module 122, the third power module 123 and the fourth power module 124, the controlling module 11 could realize the magnitudes of respective output currents. According to the magnitudes of respective output currents, the output currents of the first power module 121, the second power module 122, the third power module 123 and the fourth power module 124 are adjusted in order to achieve a current-sharing purpose. For example, once the controlling module 11 is in communication with the first power module 121, the second power module 122, the third power module 123 and the fourth power module 124, the controlling module 11 could realize the magnitudes of respective output currents. For example, the output current $I_1$ of the first power module 121 is 25 A, the output current $I_2$ of the second power module 122 is 30 A, the output current $I_3$ of the third power module 123 is 25 A, the output current $I_4$ of the fourth power module 124 is 20 A, and the total output current $Io=I_1+I_2+I_3+I_4=100$ A. For achieving a current-sharing purpose, the output currents of the plural power modules 12 should be equal. That is, the controlling module 11 will issue a notifying signal to the first power module 121, the second power module 122, the third power module 123 and the fourth power module 124. In response to the notifying signal, the output current $I_1$ of the first power module 121 is kept at 25 A, the output current $I_2$ of the second power module 122 is decreased from 30 A to 25 A, the output current $I_3$ of the third power module 123 is kept at 25 A, and the output current $I_4$ of the fourth power module 124 is increased from 20 A to 25 A. It is noted that the output currents of the plural power modules 12 may be different according to the practical requirements.

Please refer to FIG. 1 again. In a case that the controlling module 11 has a breakdown, the uninterruptible power supply 1 enters a safe mode. Meanwhile, an abnormal signal is issued from the controlling module 11 to the power modules 12. In response to the abnormal signal, the magnitude of the output voltage $V_o$ outputted from the first power module 121, the second power module 122, the third power module 123 and the fourth power module 124 will be maintained at a constant voltage value. Since the magnitude of the output voltage $V_o$ is maintained at the constant voltage value, the energy storage unit 3 will no longer be over-charged and the possibility of damaging the energy storage unit 3 is minimized. The constant voltage values are equal to the latest output voltages $V_o$ of the power modules 12 notified by the controlling module 11 before the controlling module 11 is abnormal; or the constant voltage values are lower than the latest output voltages $V_o$ of the power modules 12 notified by the controlling module 11 before the controlling module 11 is abnormal. For example, if the latest output voltages $V_o$ of the power modules 12 before the controlling module 11 is abnormal are 330V, the constant voltage values are equal to 330V or lower than 330V (e.g. 325V). In some embodiment, the constant voltage values are preset values.

In a case that the controlling module 11 is abnormal, since the plural power modules 12 are in communication with each other, the output currents of respective power modules will be determined according to the desired current values of the energy storage unit 3 and the load 4. That is, since the first power module 121, the second power module 122, the third power module 123 and the fourth power module 124 are in communication with each other, the output current $I_o$ required for powering the energy storage unit 3 and the load 4 will be realized. In addition, the output currents of the first power module 121, the second power module 122, the third power module 123 and the fourth power module 124 are adjusted in order to achieve a current-sharing purpose.

For example, when the first power module 121, the second power module 122, the third power module 123 and the fourth power module 124 are in communication with each other, the output currents of the first power module 121, the second power module 122, the third power module 123 and the fourth power module 124 are realized. For example, the output current $I_{I1}$ of the first power module 121 is 30 A, the output current $I_{I2}$ of the second power module 122 is 40 A, the output current $I_{I3}$ of the third power module 123 is 20 A, the output current $I_{I4}$ of the fourth power module 124 is 30 A, and the total output current Io=$I_{I1}$+$I_{I2}$+$I_{I3}$+$I_{I4}$=30+40+20+30=120 A. That is, the total current required for powering the energy storage unit 3 and the load 4 is 120 A. For achieving a current-sharing purpose, the output currents of the plural power modules 12 should be equal (i.e. 120 A/4=30 A). Since the first power module 121, the second power module 122, the third power module 123 and the fourth power module 124 are in communication with each other, the magnitudes of respective output currents will be dynamically adjusted. That is, the output current $I_{I1}$ of the first power module 121 is kept at 30 A, the output current $I_{I2}$ of the second power module 122 is decreased from 40 A to 30 A, the output current $I_{I3}$ of the third power module 123 is increased from 20 A to 30 A, and the output current $I_{I4}$ of the fourth power module 124 is kept at 30 A. As a consequence, the output currents of the plural power modules 12 are equal.

Figure 2:
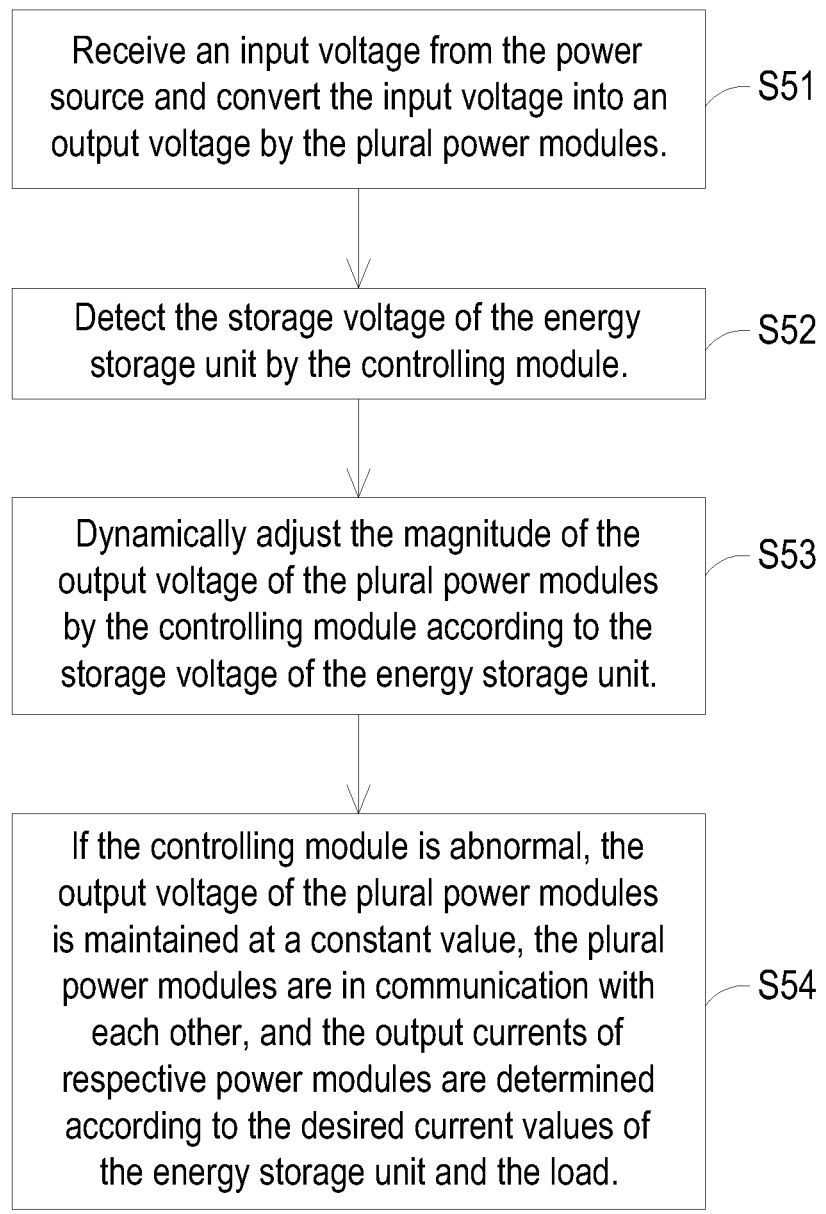
FIG. 2 is a flowchart illustrating a power supplying method for use in the uninterruptible power supply of the present invention.

FIG. 2 is a flowchart illustrating a power supplying method for use in the uninterruptible power supply of the present invention. Firstly, an input voltage $V_{in}$ from the power source 2 is received by the uninterruptible power supply 1, and the input voltage $V_{in}$ is converted into an output voltage $V_o$ by the first power module 121, the second power module 122, the third power module 123 and the fourth power module 124 (Step S51). In a normal operating mode, the controlling module 11 can detect the storage voltage $V_b$ of the energy storage unit 3 (Step S52). Next, the controlling module 11 is in communication with the first power module 121, the second power module 122, the third power module 123 and the fourth power module 124 so that the controlling module 11 could realize the magnitude of the current output voltage $V_o$. According to the storage voltage $V_b$ and the magnitude of the current output voltage $V_o$, the controlling module 11 will judge whether the magnitude of the output voltage $V_o$ needs to be adjusted or not. Once the magnitude of the output voltage $V_o$ needs to be adjusted, the magnitude of the output voltage $V_o$ of respective power modules 12 is dynamically adjusted. That is, the controlling module 11 will notify the first power module 121, the second power module 122, the third power module 123 and the fourth power module 124 to adjust respective output voltages $V_o$. Then, the controlling module 11 is in communication with the first power module 121, the second power module 122, the third power module 123 and the fourth power module 124, so that the controlling module 11 could realize the magnitudes of respective output currents. According to the magnitudes of respective output currents, the output currents of the first power module 121, the second power module 122, the third power module 123 and the fourth power module 124 are adjusted in order to achieve a current-sharing purpose (Step S53).

In a case that the controlling module 11 is abnormal, the uninterruptible power supply 1 enters a safe mode, and an abnormal signal is issued from the controlling module 11 to the power modules 12. In response to the abnormal signal, the magnitude of the output voltage $V_o$ outputted from the first power module 121, the second power module 122, the third power module 123 and the fourth power module 124 will be maintained at a constant voltage value. Since the plural power modules 12 are in communication with each other, the output currents of respective power modules will be determined according to the desired current values of the energy storage unit 3 and the load 4. That is, since the first power module 121, the second power module 122, the third power module 123 and the fourth power module 124 are in communication with each other, the output current $I_o$ required for powering the energy storage unit 3 and the load 4 will be realized. In addition, the output currents of the first power module 121, the second power module 122, the third power module 123 and the fourth power module 124 are adjusted in order to achieve a current-sharing purpose (Step S54). In a case that the controlling module 11 is abnormal, since the magnitude of the output voltage $V_o$ is maintained at the constant voltage value, the energy storage unit 3 will no longer be over-charged and the possibility of damaging the energy storage unit 3 is minimized. In addition, the output current outputted from the plural power modules 12 could achieve a current-sharing purpose. As a consequence, the reliability of the uninterruptible power supply is largely enhanced.

From the above description, the uninterruptible power supply and the power supplying method of the present invention are capable of providing stable power even if the controlling module is abnormal. In a case that the controlling module is abnormal, the magnitude of the output voltage from the plural power modules is maintained at a constant voltage value to continuously provide electrical energy to the energy storage unit and the load. As a consequence, the energy storage unit will no longer be over-charged and the possibility of damaging the energy storage unit is minimized. Since the plural power modules are in communication with each other, the output currents of respective power modules could be determined according to the desired current values of the energy storage unit and the load in order to largely increase the reliability of the uninterruptible power supply.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply connected with an energy storage unit and a load, and receiving an input voltage from a power source, said uninterruptible power supply comprising:

plural power modules electrically connected with said power source, said energy storage unit and said load for converting said input voltage into an output voltage; and a controlling module electrically connected with said plural power modules and said energy storage unit for detecting a storage voltage of said energy storage unit and dynamically adjusting said output voltage of said plural power modules according to said storage voltage of said energy storage unit, wherein if said controlling module is abnormal, the magnitude of said output voltage is maintained at a constant voltage value.

2. The uninterruptible power supply according to claim 1, wherein said plural power modules are in communication with each other, and if said controlling module is abnormal, output currents of respective power modules are determined according to desired currents of said energy storage unit and said load.

3. The uninterruptible power supply according to claim 1, wherein output currents of respective power modules are adjusted to be equal.

4. The uninterruptible power supply according to claim 1, wherein said constant voltage value is equal to the latest output voltage value of said plural power modules notified by said controlling module before said controlling module is abnormal.

5. The uninterruptible power supply according to claim 1, wherein said constant voltage value is lower than the latest output voltage value of said plural power modules notified by said controlling module before said controlling module is abnormal.

6. The uninterruptible power supply according to claim 1, wherein said constant voltage value is a preset voltage value, and once said controlling module is abnormal, said output voltage of said plural power modules is adjusted to be equal to said preset voltage value.

7. A power supplying method for use with an uninterruptible power supply, said uninterruptible power supply comprising a controlling module and plural power modules, said uninterruptible power supply being connected with an energy storage unit, a load and a power source, said power supplying method comprising steps of:

receiving an input voltage from said power source, and converting said input voltage into an output voltage by said plural power modules;

detecting a storage voltage of said energy storage unit by said controlling module;

dynamically adjusting the magnitude of said output voltage of said plural power modules by said controlling module according to said storage voltage of said energy storage unit; and maintaining the magnitude of said output voltage at a constant voltage value if said controlling module is abnormal.

8. The power supplying method according to claim 7, wherein all of said power modules are connected with each other in parallel to output said output voltage, and all of said power modules are in communication with each other.

9. The power supplying method according to claim 7, wherein if said controlling module is abnormal, an abnormal signal is issued from said controlling module to said plural power modules, and wherein in response to said abnormal signal, said output voltage of said plural power modules is maintained at said constant voltage value.

10. The power supplying method according to claim 7, wherein said plural power modules are in communication with each other, and if said controlling module is abnormal, output currents of respective power modules are determined according to desired currents of said energy storage unit and said load.

11. The power supplying method according to claim 7, wherein said constant voltage value is equal to the latest output voltage value of said plural power modules notified by said controlling module before said controlling module is abnormal.

12. The power supplying method according to claim 7, wherein said constant voltage value is lower than the latest output voltage value of said plural power modules notified by said controlling module before said controlling module is abnormal.

13. The power supplying method according to claim 7, wherein said constant voltage value is a preset voltage value, and once said controlling module is abnormal, said output voltage of said plural power modules is adjusted to be equal to said preset voltage value.

* * * * *